United States Patent
Vincent et al.

(10) Patent No.: US 8,774,213 B2
(45) Date of Patent: Jul. 8, 2014

(54) FRAMEWORKS AND INTERFACES FOR OFFLOAD DEVICE-BASED PACKET PROCESSING

(75) Inventors: Pradeep Vincent, Kenmore, WA (US); Matthew D. Klein, Seattle, WA (US); Samuel J. McKelvie, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 319 days.

(21) Appl. No.: 13/076,347

(22) Filed: Mar. 30, 2011

(65) Prior Publication Data
US 2012/0250682 A1    Oct. 4, 2012

(51) Int. Cl.
*H04L 12/66* (2006.01)

(52) U.S. Cl.
USPC .............. 370/463; 370/474; 370/235

(58) Field of Classification Search
None
See application file for complete search history.

(56) References Cited

U.S. PATENT DOCUMENTS

| | | | |
|---|---|---|---|
| 5,991,292 A * | 11/1999 | Focsaneanu et al. | 370/352 |
| 7,620,070 B1 | 11/2009 | Maufer et al. | |
| 2003/0065812 A1 | 4/2003 | Beier et al. | |
| 2004/0062245 A1 | 4/2004 | Sharp et al. | |
| 2009/0049288 A1 * | 2/2009 | Weissman | 712/245 |
| 2009/0199290 A1 | 8/2009 | McCullough et al. | |
| 2009/0287848 A1 | 11/2009 | Kamura et al. | |
| 2010/0161847 A1 * | 6/2010 | Riddoch | 710/22 |
| 2010/0275199 A1 | 10/2010 | Smith et al. | |
| 2011/0090911 A1 * | 4/2011 | Hao et al. | 370/395.53 |
| 2012/0207158 A1 * | 8/2012 | Srinivasan et al. | 370/390 |
| 2012/0250682 A1 * | 10/2012 | Vincent et al. | 370/390 |

OTHER PUBLICATIONS

International Search Report and Written Opinion issued in corresponding International Application No. PCT/S12/31121 dated Jun. 29, 2012. (7 pages).

* cited by examiner

*Primary Examiner* — Robert Wilson
(74) *Attorney, Agent, or Firm* — Novak Druce Connolly Bove + Quigg LLP

(57) ABSTRACT

High-speed processing of packets to, and from, a virtualization environment can be provided while utilizing hardware-based segmentation offload and other such functionality. A hardware vendor such as a network interface card (NIC) manufacturer can enable the hardware to support open and proprietary stateless tunneling in conjunction with a protocol such as single root I/O virtualization (SR-IOV) in order to implement a virtualized overlay network. The hardware can utilize various rules, for example, that can be used by the NIC to perform certain actions, such as to encapsulate egress packets and decapsulate packets.

21 Claims, 8 Drawing Sheets

FRAMEWORKS AND INTERFACES FOR OFFLOAD DEVICE-BASED PACKET PROCESSING

BACKGROUND

As an increasing number of applications and services are being made available over networks such as the Internet, an increasing number of content, application, and/or service providers are turning to multi-tenant, shared resource technologies. Cloud computing, for example, can provide customers with access to electronic resources through services, such as Web services, where the hardware and/or software used to support those services is dynamically scalable to meet the needs of the services at any given time. A customer typically will rent, lease, or otherwise pay for access to resources through the cloud, and thus does not have to purchase and maintain the hardware and/or software needed.

Such access comes with risks for providers of these shared resources, however, as there typically will be multiple users accessing the resources at various times. In cases where users have a virtual address space, such that the customer network functions as a single virtual network without the restrictions or additional addresses of one or more additional physical networks, it can be desirable to provide for the processing and routing of packets pertaining to this virtual address space. When customers have access to the devices, however, performing the routing and processing on a device can potentially enable the user to modify the routing or other such processing of the packets. Further, such functionality cannot easily be moved to many existing hardware devices that are not exposed to the user, for reasons such as size restrictions, protocol limitations, etc.

BRIEF DESCRIPTION OF THE DRAWINGS

Various embodiments in accordance with the present disclosure will be described with reference to the drawings, in which.

DETAILED DESCRIPTION

Figure 1:
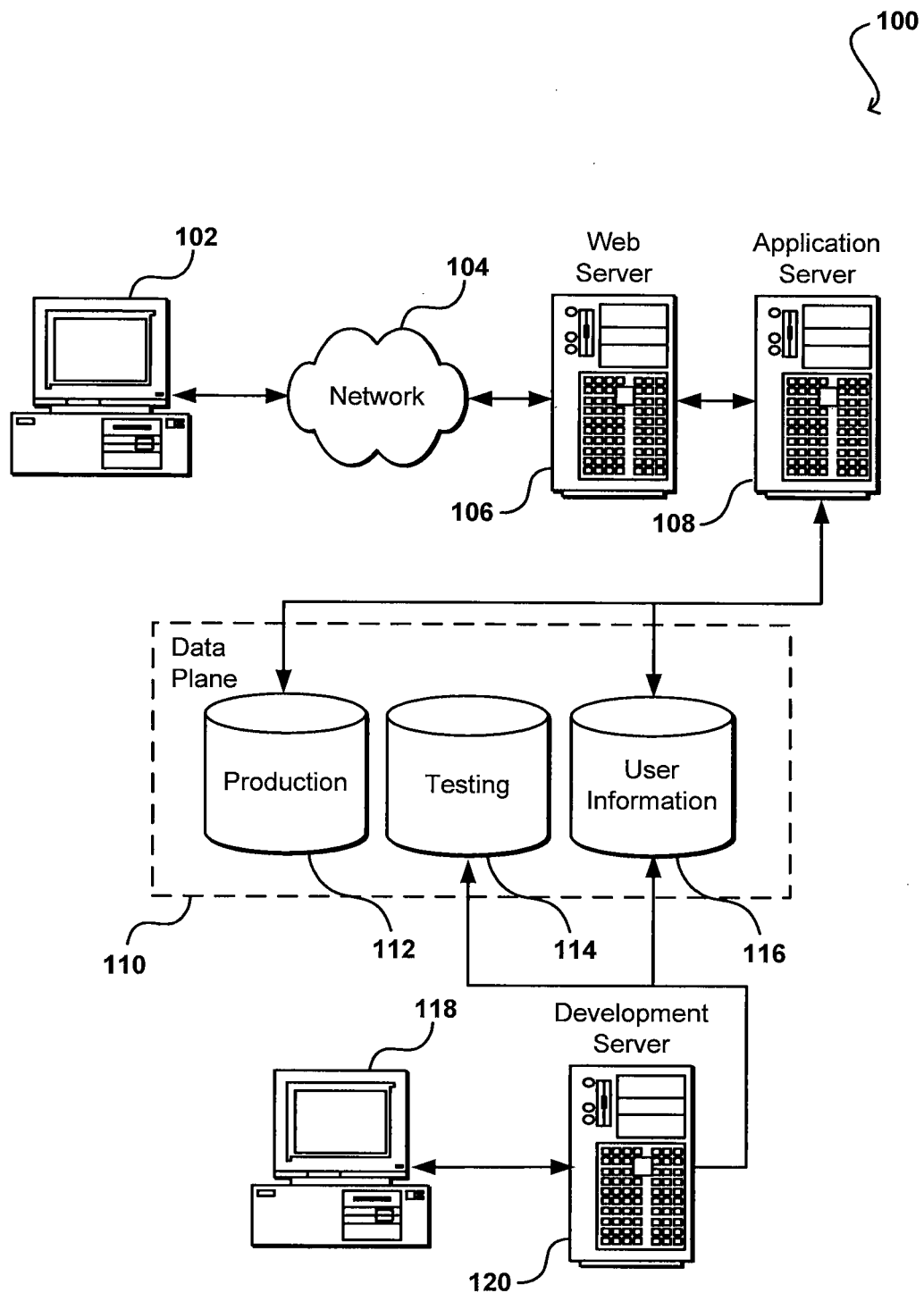
FIG. 1 illustrates an environment in which various embodiments can be implemented.

Systems and methods in accordance with various embodiments of the present disclosure may overcome one or more of the aforementioned and other deficiencies experienced in conventional approaches to managing resources in an electronic environment. Systems and methods in accordance with various embodiments provide for the processing of packets between a first address space, such as a customer or virtual address space, and a second address space, such as a cloud network provider or physical address space. Features such as segmentation and de-segmentation offload features of commodity devices, such as various network offload devices, can be used to help reduce the overhead related to network traffic, particularly as it relates to a virtualized environment. Various approaches to providing segmentation and de-segmentation offload features are described, for example, in co-pending U.S. patent application Ser. No. 12/556,453,entitled "Stateless Packet Segmentation and Processing," filed "Sep. 9, 2009," and application Ser. No. 12/885,258, entitled "Framework for Stateless Packet Tunneling," filed Sep. 17, 2010, each which is hereby incorporated herein by reference.

Various embodiments enable a an offload device to support open and proprietary stateless tunneling in conjunction with a protocol such as single root I/O virtualization (SR-IOV) in order to implement a virtualized overlay network. SR-IOV generally refers to a standard specification for interoperability that enables a device such as a peripheral component interconnect (PCI) device to appear as multiple, independent physical devices. SR-IOV takes advantage of physical functions (PFs) and virtual functions (VFs). Physical functions are generally full-featured functions, while virtual functions are generally more lightweight functions that may lack at least some configuration resources. SR-IOV typically requires support in the BIOS, as well as support in the hypervisor or operating system instance running on the hardware.

In at least some embodiments, an offload device (or a vendor or manufacturer of such a device) can provide specific functionality for packet processing. For example, an implementation based on Dom-0 (i.e., domain zero, typically the first domain started by the Xen hypervisor at boot time) can utilize various rules that can be used by an offload device to perform certain actions, such as to encapsulate egress packets and decapsulate ingress packets. Egress packet source checking may be performed on every egress packets based on the source VM, including verifying the source MAC address and source IP address. In some embodiments, the offload device can enforce specific VLAN (virtual local area network) tags or otherwise add VLAN tags. After egress packet source checking, the packets can be matched against a list of existing rules. If there is a match, a corresponding encapsulation action can taken on the packet and the packet transmitted accordingly. If not, the packet can be sent to Dom-0 control software for further processing.

For ingress packets, the packets in certain embodiments can be identified as being encapsulated using a special format based, for example, on a pre-defined IP protocol number and a pre-defined one-byte value at a pre-defined offset from L2 header end. These values can each be configured by the Dom-0. All ingress packets that are not encapsulated can be delivered to the Dom-0. For encapsulated ingress, any opaque bits (located just after the outer L3 header) can be identified using a pre-defined length of opaque bits. Each packet can further be classified as belonging to a particular virtual machine (VM) (e.g., a SR-IOV vector) using a one byte field in the opaque bits at a pre-defined offset.

Each SR-IOV function can be configured with a set of ingress rules. Each rule can consist primarily of opaque bits to be matched with opaque bits of encapsulated ingress packets, an outer source IP address, an outer destination IP address, and source & target MAC addresses. When an ingress encapsulated packet matches one of the ingress rules for a particular SR-IOV function (i.e., the opaque bits match), the packet can be decapsulated (i.e., the opaque bits are removed), the TTL of the inner IP header is decremented by a value specified in the rule, and the packet is delivered to the VM corresponding to the SR-IOV function. Ingress packets that do not match any of the rules can be delivered to the Dom-0.

In at least some embodiments, the offload device will maintain a packet count and a byte count for each encapsulation and decapsulation rule that could be read or reset from Dom-0. Various embodiments also can provide the ability to inject packets into an SR-IOV function from the Dom-0. Certain embodiments can provide a debug mode wherein each packet is forced to go through the Dom-0 irrespective of the matching rules that are in effect. A maximum transmission unit (MTU) for an SR-IOV functions can be set from the Dom-0, in at least one embodiment defaulting to 1500. If and when a guest attempts to change the MTU size, the offload device can ensure that the proposed MTU does not exceed the maximum MTU set by the Dom-0. In some embodiments, the offload device can also perform connection tracking, which can be used to provide a stateful firewall implementation on the offload device.

In at least some embodiments, Dom-0 control software can be provided that manages the encapsulation and decapsulation rules for both ingress and egress packets. The Dom-0 control software can manage the Address Resolution Protocol (ARP) cache for the substrate network, for example, using packet count statistics provided by the offload device, as well as substrate ARP queries. The Dom-0 control software can also determine which rules, if any, must be pushed to the offload device and which rules must be managed by Dom-0 as overflow rules in the event that the offload device does not support all the rules that are needed.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. An electronic client device 102 can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 106, application server 108 and similar components can be considered to be part of the data plane. The handling of all requests and responses, as well as the delivery of content between the client device 102 and the application server 108, can be handled by the Web server. It should be understood that the Web and application servers are not required and are merely example components, as structured code can be executed on any appropriate device or host machine as discussed elsewhere herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data stores of the data plane 110 can include several separate data tables, databases, or other data storage mechanisms and media for storing data relating to a particular aspect. For example, the data plane illustrated includes mechanisms for storing production data 112 and user information 116, which can be used to serve content for the production side. The data plane also is shown to include a mechanism for storing testing data 114, which can be used with the user information for the testing side. It should be understood that there can be many other aspects that may need to be stored in a data store, such as for page image information and access right information, which can be stored in any of the above listed mechanisms as appropriate or in additional mechanisms in the data plane 110. The data plane 110 is operable, through logic associated therewith, to receive instructions from the application server 108 or development server 120, and obtain, update, or otherwise process data, instructions, or other such information in response thereto. In one example, a user might submit a search request for a certain type of item. In this case, components of the data plane might access the user information to verify the identity of the user, and access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for various content providers or other such entities, wherein multiple hosts and various types of resources might be used to perform tasks such as serving content, authenticating users, allocating resources, or performing any of a number of other such tasks. Some of these hosts may be configured to offer similar functionality, while other servers might be configured to perform at least some different functions. The electronic environment in such cases might include additional components and/or other arrangements, such as those illustrated in the configuration 200 of FIG. 2, discussed in detail below.

Systems and methods in accordance with one embodiment provide at least one resource access gateway, or control plane, either as part of the data environment or in a path between the user and the data plane, that enables users and applications to access shared and/or dedicated resources, while allowing customers, administrators, or other authorized users to allocate resources to various users, clients, or applications and ensure adherence to those allocations. Such functionality enables a user to perform tasks such as storing, processing, and querying relational data sets in a cloud without worry about latency degradation or other such issues due to other users sharing the resource. Such functionality also enables guest users to obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

A resource gateway or control plane 208 can be used in some environments to provide and/or manage access to various resources in the data plane 232. In a cloud computing environment, this can correspond to a cloud manager 210 or similar system that manages access to the various resources in the cloud. In one embodiment, a set of application programming interfaces (APIs) 220 or other such interfaces are provided that allow a user or customer to make requests for access to various resources. Once access is established, a resource is allocated, etc., a user can communicate directly with the resource to perform certain tasks relating to that resource, such as data storage or processing. The user can use direct interfaces or APIs to communicate with the data instances, hosts, or other resources once access is established, but uses the control plane component(s) to obtain the access.

Figure 2:
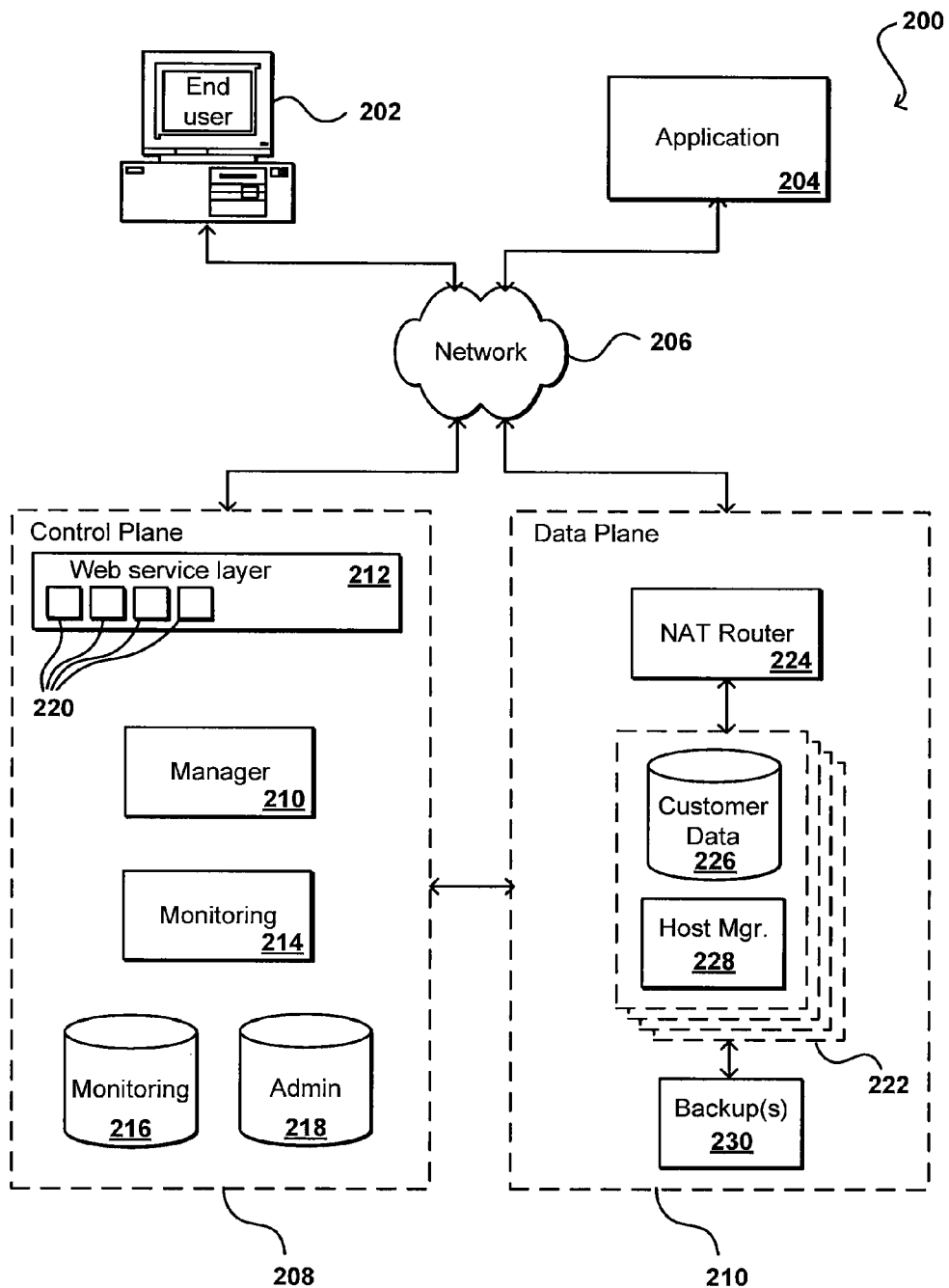
FIG. 2 illustrates an environment for providing access to various resources that can be used in accordance with one embodiment.

FIG. 2 illustrates an example of a configuration 200, such as may include a cloud computing manager system, that can be used in accordance with one embodiment. In this example, a computing device 202 for an end user is shown to be able to make calls through a network 206 to a control plane 208 (or other such access layer) to perform a task such as to obtain access to a specified resource or resource type. While an end user computing device and application are used for purposes of explanation, it should be understood that any appropriate user, application, service, device, component, or resource can access the interface(s) and components of the connection component and data environment as appropriate in the various embodiments. Further, while certain components are grouped into a data "plane," it should be understood that this can refer to an actual or virtual separation of at least some resources (e.g., hardware and/or software) used to provide the respective functionality. Further, the control plane can be considered to be part of the data plane in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs (or other such interfaces) for receiving Web services calls or other such requests from across the network 206, which a Web services layer 212 can parse or otherwise analyze to determine the steps or actions needed to act on or process the call. For example, a Web service call might be received that includes a request to establish a connection to a data repository for to execute a query for a user. In this example, the Web services layer can parse the request to determine the type of connection or access needed, the appropriate type(s) of resource needed, or other such aspects.

The control plane can include one or more resource allocation managers 210, each responsible for tasks such as validating the user or client associated with the request and obtaining or allocating access to the appropriate resource(s). Such a system can handle various types of request and establish various types of connection. Such a system also can handle requests for various types of resources, such as specific graphic processors or other types of hardware or hardware functionality, and can provide access to the appropriate resource(s). Components of the data plane, or the resource layer of the cloud, can perform the necessary tasks to provide the resource. For access to a data instance, for example, this can include tasks such as provisioning a data store instance, allocating a volume of off-instance persistent storage, attaching the persistent storage volume to the data store instance, and allocating and attaching an IP address (derived from DNS mappings) or other address, port, interface, or identifier which the customer can use to access or otherwise connect to the data instance. For tasks such as obtaining processing of an instruction using a particular type of hardware, for example, the components of the data plane, in conjunction with the control plane, can perform actions such as provisioning a device for a user and providing shared and/or dedicated access to the resource for a period of time at a particular level of access to the resource. In this example, a user can be provided with the IP address and a port address to be used to access a resource. A user then can access the resource directly using the IP address and port, without having to access or go through the control plane 208.

The control plane 208 in this embodiment also includes at least one monitoring component 214. When a data instance or other resource is allocated, created, or otherwise made available in the data plane, information for the resource can be written to a data store accessible to the control plane, such as a monitoring data store 216. It should be understood that the monitoring data store can be a separate data store or a portion of another data store. A monitoring component 214 can access the information in the monitoring data store 216 to determine information such as the past usage of resources by various users, a current number or type of threads or resources being allocated to a user, and other such usage information. A monitoring component also can call into components of the data environment to determine information such as the number of active connections for a given user in the data environment and aspects about the usage of each connection. A monitoring component can constantly monitor the usage of each resource by a user, client, etc., having an allocation provided through the connection manager. A monitoring component also can access information stored in an administrative ("Admin") or similar data store 216, which can store information such as the general allocation granted to a user, throttling or limiting information for a user, resource permissions for a user, or any other such information that can be specified and/or updated by an administrator or other such user.

In an example where users request connections to various data instances, each instance 222 in the data environment can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager can be responsible for managing and/or performing tasks such as setting up the instances for a new repository, including setting up logical volumes and file systems, installing database binaries and seeds, and starting or stopping the repository. A host manager can monitor the health of the data store, monitoring the data store for error conditions such as I/O errors or data storage errors, and can restart the data store if necessary. A host manager can also perform and/or manage the installation of software patches and upgrades for the data store and/or operating system. A host manager also can collect relevant metrics, such as may relate to CPU, memory, and I/O usage.

The resource manager 210 can communicate periodically with each host manager 228 for which a connection has been established, or to an administration server or other component of the resource environment, to determine status information such as load, usage, capacity, etc.

As discussed, once a resource is provisioned and a user is provided with an IP address derived from DNS mappings or other address or location, the user can communicate "directly" with components or resources of the data plane 232 through the network using a Java Database Connectivity (JDBC) or other such protocol to directly interact with that resource 222. In various embodiments, as discussed, the data plane takes the form of (or at least includes or is part of) a computing cloud environment, or a set of Web services and resources that provides data storage and access across a "cloud" or dynamic network of hardware and/or software components. An IP address derived from DNS mappings is beneficial in such a dynamic cloud environment, as instance or availability failures, for example, can be masked by programmatically remapping the IP address to any appropriate replacement instance for a use. A request received from a user 202 or application 204, for example, can be directed to a network address translation (NAT) router 224, or other appropriate component, which can direct the request to the actual resource 222 or host corresponding to the mapped address of the request. Such an approach allows for instances to be dynamically moved, updated, replicated, etc., without requiring the user or application to change the IP address or other address used to access the instance. In some cases, a resource 222 such as a data instance can have at least one backup instance 230 or copy in persistent storage.

As discussed, a resource can be shared among multiple users, clients, applications, etc., either concurrently or at different times, with varying levels of access or allocation. When a user has dedicated access to a machine or resource, the user might also have native or "bare metal" access to the resource for a period of time, depending on the type of access needed, and other such factors. Providing this level of access to a resource comes with potential risks for a provider of the resource, as a user having native access to the device can have the ability to modify firmware or other configuration information for the resource, which can affect the ability of a subsequent user to utilize the resource without first re-imaging or otherwise verifying the state of the resource.

Various embodiments enable a provider to grant a user or customer with substantially full access to a hardware resource with a reasonable level of security. This native-level access to remote hardware can be provided for resources such as servers, hosts, and cluster instances, for example. For resources such as cluster instances, customers may have native access to a subset of the hardware resources, such as may include peripheral devices connected using a component such as a peripheral component interconnect (PCI) bus. These peripheral devices can include network interface cards (NICs), graphics processing units (GPUs), and similar devices that would often be virtualized in a current cloud environment. In the some cases, a customer might have full access to an entire machine, or groups of machines, including any or all devices incorporated therein. For a group of machines such as a rack of servers, a user might be granted substantially full access to the entire rack, including any switches or other devices or components provided as part of the rack.

Certain providers present such hardware resources as a virtualized abstraction, such that management of the physical hardware can occur in a "more trustworthy" execution context, and can provide additional benefits such as the ability to migrate customers to different resources without interrupting execution and, since customers or "guests" are not tied to specific hardware, the ability for vendors to compete to provide the best utility computing value for price. Also, fewer and more simple guest instance images can be used, as guests do not need a multitude of hardware-specific drivers. Such virtualization can come with potentially significant costs, however, as virtualization can incur order-of-magnitude performance penalties for hardware that does not include native acceleration for virtualization, and virtualization of a particular hardware device can consume substantial resources unrelated to that device (e.g., a processor and/or memory used to virtualize a network interface). Also, virtualization support can lag years behind commodity availability of new hardware (e.g., video cards), and certain appliance hardware is often too specific or "niche" to ever warrant compelling virtualization support. There are potentially large market opportunities in supporting high-margin niche appliances or in being the first-to-market for cloud support of new hardware types. Providing such support through native access, however, can leave vulnerable various aspects of the internal cloud, such as provisioning technology, billing, resource utilization and balancing, and the network layer-2 layout, for example, and can violate threat models well beyond customer requirements.

Various embodiments can provide for "partial" or "substantially" full access to a resource, such as a host server, by providing users with native access to the host hardware or specific devices, such as cards plugged into a peripheral control bus or similar hardware datapath. In certain embodiments where specific levels of performance are an issue, technology such as an input/output memory management unit (I/O MMU) can be used to "assign" peripheral devices to guest operating systems (e.g., virtualization technology for directed I/O (Intel's VT-D)), effectively giving guests native access to only those peripheral devices. As should be apparent to one of ordinary skill in the art, a guest operating system (OS) can refer to different systems in different embodiments, such as a virtual machine hosting an running OS with at least partial non-virtualized access to some hardware or machine state that the OS or hypervisor depends upon including BIOS, configuration, etc., that is not under the administrative control of the hosting provider. In other embodiments, the guest OS might refer to an OS that is not under the administrative control of the hosting provider running without full virtualization. In one embodiment, an MMU can logically connect a direct memory access (DMA)-capable I/O bus (e.g., a PCI bus) to main memory on a host, and can manage mapping of I/O devices to physical addresses to regulate the flow of information from a guest to various PCI or similar devices. These devices can include, for example, graphics processing unit (GPU) co-processors, high-performance NICs, disk controllers, or other "niche" co-processing devices, such as cryptographic cards or hardware codecs. In some instances, virtualization or other such technology can be used to provide a level of separation between guests and host machines from the central system hardware (e.g., CPU, memory, etc), with native access potentially being available for specific devices on a given host. In other embodiments, native access can be provided to any hardware included in, or available for, a specific host.

One of the main issues with providing customers with native access to specific hardware is that customers may have the ability to modify privileged configuration or BIOS (basic I/O system) settings, or other firmware images on host hardware. These changes can persist across a reboot of the physical system, such that the hardware may not return to the same state that the hardware was in before that customer was granted access to the host or its device(s). In the case of dynamically configurable settings for a virtual machine monitor (VMM) managed by a Ring-1 hypervisor, for example, the changes would in general not persist across reboot, but could persist across instantiations of guest operating systems in a virtualized environment (e.g., chipset settings to support IOMMU technology). This ability for a customer to modify settings or firmware that otherwise should be immutable can have serious security implications. For example, malicious software (e.g., Trojans or viruses) can be inserted into firmware for various devices. Even if firmware changes do not involve intentionally malicious programming, however, the changes still can still be unintentionally damaging by causing performance and/or compatibility issues. Firmware flashing can potentially physically destroy the hardware irreparably (a.k.a. "bricking" the hardware). Certain technologies have been developed that may address at least some of these challenges, particularly for motherboard firmware or chipset configurations. These technologies include, for example, Trusted Platform Module (TPM), LaGrande Technology (LT) from Intel, measured boot technology, trusted boot technology, Dynamic Root of Trust (DRTM), and Static Root of Trust (SRTM) technology. None of these solutions, however, are known to address various issues specific to device firmware, entire hosts, and other such hardware aspects.

Figure 3:
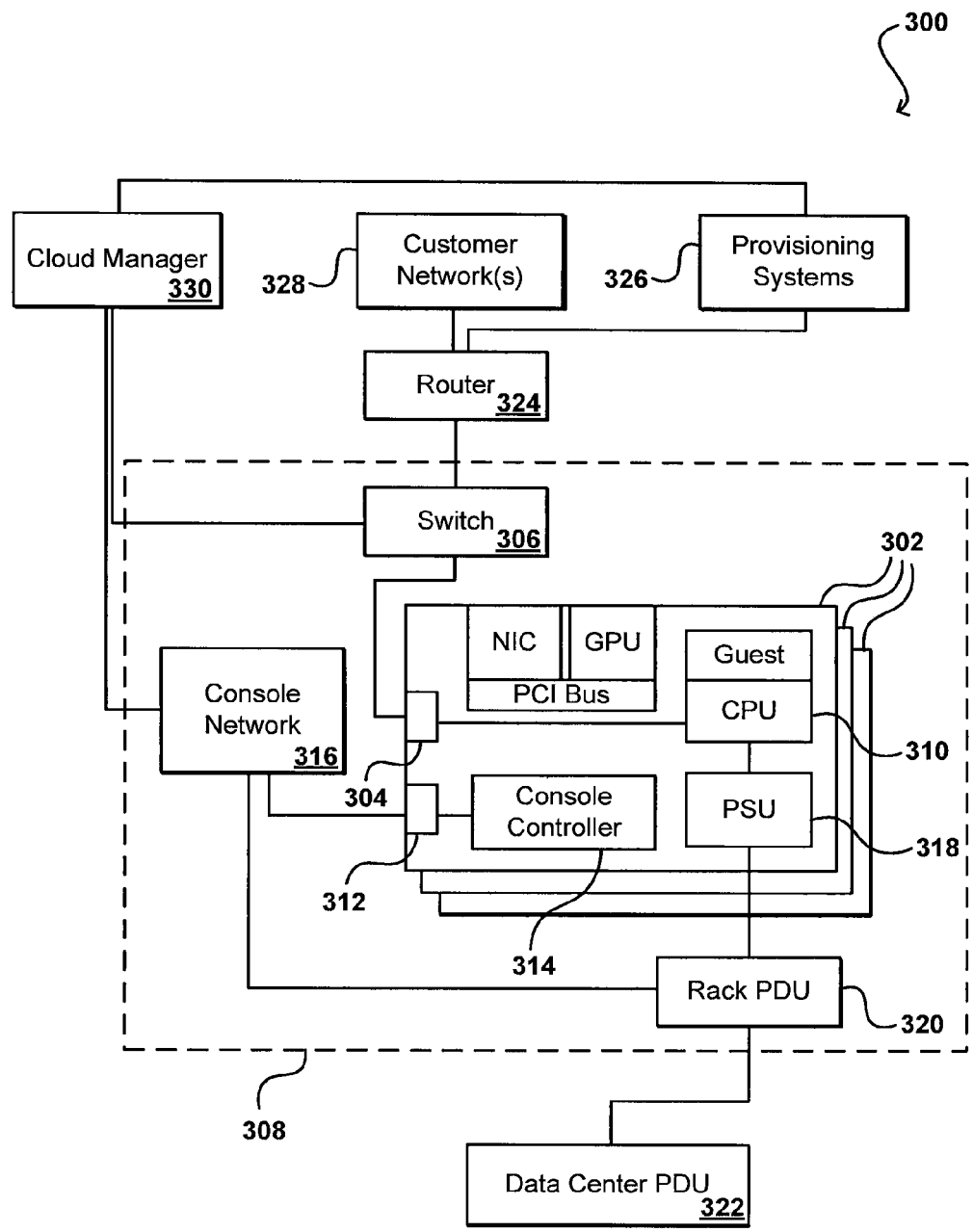
FIG. 3 illustrates a configuration for accessing specific hardware resources that can be used in accordance with one embodiment.

Systems and methods in accordance with various embodiments can prevent and/or monitor the access and/or manipulation of firmware images or configuration information by guests in a cloud or similar electronic environment. In certain embodiments, a customer can be provided with dedicated guest access to a hardware resource for any desired period of time, such as a matter of hours or even minutes. FIG. 3 illustrates an example of a configuration 300 that can be used to provide such native access to a customer in accordance with one embodiment. This example will be discussed with respect to granting a user access to a peripheral device in a host machine using conventional PCI-based technology, but it should be understood that this is merely an example and that approaches within the scope of the various embodiments can be used with any appropriate hardware (including based on different bus technologies or with greater or lesser degrees of system integration within individual components or "chips"), software, and protocols currently used or subsequently developed for such purposes.

This example configuration 300 includes a set of host devices 302, such as servers or similar devices, that each can have a series of network ports 304. Some of these ports can function as "production" ports which connect each host to at least one network switch 306 capable of processing and routing network traffic to/from each device. In some embodiments the network switch can be a "smart" network switch, while in other embodiments segregation can happen at a higher level in the network than the first tier of switches. In a data center example, there might be one smart switch for each rack of servers 308, for example. At least one of these network ports 304 can host traffic for a guest operating system, where the guest is effectively operating "on top of" at least one central processing unit (CPU) 310 in the allocated or partitioned host device (e.g., server) 302 that has access to this production network port. The host device 302 also can have at least one console port 312 and a console controller 314, which can connect to a separate console network 316. This "console network" also can be implemented using the same network technology as the "production network," such as Ethernet technology. In some embodiments, at least some of these ports can be merged but logically separated (e.g., muxed on the same physical port). Each host device also can have one or more dedicated power supply units (PSUs) 318, which can be accessed by the console controller and/or the main CPU, whereby the machine can be powered off via either the host CPU or a device on the network, for example. The power supply for every server in a rack can be connected to a rack power distribution unit (PDU) 320, which can be connected by a higher power cable to one or more data center PDUs 322, each of which can support multiple rack PDUs. In some cases, the hosts 302 can be powered on and off by running a line to the console controller from the rack PDU with relays or other such components to power cycle each device.

At least one router 324 can connect the host devices to one or more provisioning systems 326, and the switch and/or router can manage access to these provisioning systems. In some embodiments, network traffic within a rack is aggregated in order to minimize the number of cables leaving each rack. In some embodiments a capability such as a preboot execution environment (PXE) exists on a host machine 302 at the production network port 304, such that power can be cycled using the console and when the machine boots the PXE code can execute on the network port. PXE access could also be enabled or disabled depending on the type of reboot that has been authorized. For example, reboots could be allowed from local images on the host for customer initiated reboots, but PXE access can be disabled upstream. When the switch 306 is configured to connect a host machine 302 to the provisioning systems, the PXE can connect the device to the provisioning systems and boot the machine into a RAM (random access memory) disk or other block of storage, for example, which enables control operations such as firmware flashing or provisioning of a new customer image. A RAM disk with specialized drivers in one embodiment can be used to boot and/or run an untrusted or unknown image, which might not otherwise be able to boot on a specific machine. Provisioning images thus can be received, over the network to the PXE, which contain provisioning code or firmware flashing code. Once provisioning is completed, authorized customer networks 328 can interact with the devices 302 via the switch 306. The provisioning and control systems can control the switch in real time with no humans involved, as the automatic switching of that path can be based on provisioning events and external coordination, for example. The coordination can be provided and/or managed by an external system, such as a cloud manager database and system 330, or other such control plane or control system as discussed elsewhere herein, which can instruct the provisioning system(s) 326, console network 316, and rack components to perform certain actions. The cloud manager 330 can include one or more workflow systems that work with a central database, in one embodiment, to perform various aspects of resource management.

In an environment such as a cloud computing environment where different physical servers may be used to host customers at different times, it can be desirable to provide a level of abstraction for a user or customer network to avoid dependencies on resource allocations that can change over time. Virtual network equipment presentation such as customer network routers and customer network firewalls can also be achieved using overlay networking technology. For example, a customer's virtual local network or other virtual network between multiple computing nodes may be provided in at least some embodiments by creating an overlay network over one or more intermediate physical networks separating the multiple computing nodes. The overlay network may be implemented in various ways in various embodiments, such as by encapsulating communications and embedding virtual network address information for a virtual network in a larger physical network address space used for a networking protocol of the one or more intermediate physical networks.

This allows customers to utilize a standardized address space for addressing resources in the customer network. By utilizing a standardized address space, a customer can create a "virtual" or overlay network that can use common base addresses, sub-networks, etc., without the restrictions that the substrate network places on the physical address space.

Using virtualization, a number of virtual machine instances can be generated that appear and function to a user as being a part of the customer network, but that are mapped to actual servers or other physical resources in a separate or remote cloud, network, etc. As discussed, using a standardized address space can require the building and maintaining of a mapping between the physical substrate addresses and the virtual overlay addresses that are used for the customer address space. In some existing approaches, a central processing unit running on a host device can control the mapping of the virtual and physical addresses, such that a request received from a customer can be directed to the appropriate resource. This can take the form of data packet encapsulation and decapsulation, for example, wherein the physical address and/or header information can "co-exist" at various times with the virtual address and/or header information, such that a packet can be addressed to the virtual address by a source on the customer network, but can be properly routed to the appropriate physical address by adding the physical header information when in the cloud or remote network infrastructure.

Figure 4:
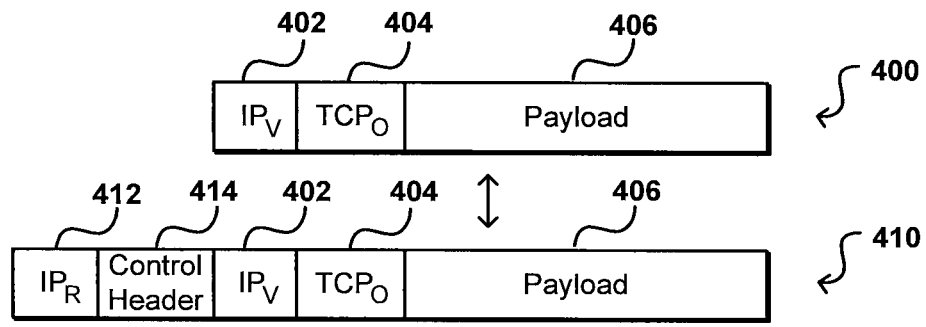
FIG. 4 illustrates a packet encapsulation process that can be used in accordance with one embodiment.

For example, FIG. 4 illustrates an example wherein a packet 400 received from a customer or "overlay" network is encapsulated in order to be routed within a physical substrate network on which the virtual cloud environment is hosted, in accordance with one embodiment. In this example, the received customer packet 400 includes three main parts: a virtual address 402 (such as a "virtual IP address" relevant to the customer overlay network, here denoted "$IP_v$"), a protocol header 404 (such as an original transmission control protocol header as found in the Internet Protocol suite, here denoted "$TCP_o$"), and a data or "payload" portion 406. The virtual IP address can be an address relevant only to the customer or overlay network. In order to properly route the packet to the intended destination host, this packet can be encapsulated to include an "external" data structure or frame that can route the packet within the substrate network or cloud or other such grouping of resources. In this example, the encapsulation process is shown to produce a "substrate" packet or datagram 410, which includes the $IP_v$, $TCP_o$, and payload of the original customer packet, but has appended thereto additional "header" information, here including a physical or "real" address 412 (such as the IP address or "$IP_R$" within the substrate network of the cloud) and a control header 414 (such as a protocol header useful by the control plane to process and/or route the packet). Without the appending any of this "real" information, the routers and other such components which host the cloud infrastructure would generally not be able to properly route the packets to the appropriate destination(s), since the customer routing information (e.g., embodied by 402) is only meaningful to the customer's overlay network and not the physical networking infrastructure to which the cloud host resources are connected. In some embodiments, any customer packet being received to a device in the cloud can be encapsulated to include this physical routing information to be used within the cloud. Since the first device to receive a packet in the cloud can be considered to be on the "edge" of the cloud, these devices will be referred to herein as "edge" devices. An "edge" device as used herein can refer to any device in hardware and/or software capable of receiving a packet of information from outside the cloud, and/or capable of transmitting a packet of information from inside the cloud. The encapsulation process can happen at any appropriate edge device in some embodiments, while in other embodiments the edge devices can route the packets to an encapsulation component or other device capable of encapsulating or decapsulating the packets. As should be understood, when a packet is to be transmitted back to the customer network, or otherwise transmitted outside the cloud, a "decapsulation" process can be performed wherein the $IP_R$ 412 and a control header 414 are removed and the packet can be routed using the virtual address space information for the customer network. For purposes of simplicity the process of encapsulation will be discussed with respect to various embodiments, but it should be understood that a decapsulation process can also be performed using such components and processes in accordance with the various embodiments.

Certain conventional approaches perform a level of encapsulation on hardware such as host devices and servers. In these approaches, a central processor can perform the encapsulation procedure in order to route packets received to a network port, network interface card (NIC), or similar device. The encapsulation process in general is not exposed to the user. In some embodiments, the driver for the NIC would be directly accessible by the processor, such that the processor can access a mapping mechanism or distributed mapping service to map physical substrate packets to virtual overlay packets, and vice versa, before routing packets to, or from, the customer networks via the NIC. In some cases, the mapping information can be distributed from a centralized service to each appropriate node across the cloud.

As discussed, however, a resource provider might want the ability to provide users or customers with substantially full native access, or "bare metal" access, to a hardware resource such as a host machine. If the mapping is managed by an application executing on a CPU of the host machine, for example, then that mapping can potentially be accessed by a user or guest operating system (OS) executing on the host machine. Such access can potentially compromise the mapping service, and can enable a guest operating system to redirect packets, reject packets, or otherwise impact the processing of packets in the cloud network. Further, such functionality could be compromised such that packets can be sent to unintended locations outside the cloud. Other potential problems include "packet spoofing," wherein a host sends packets which appear to originate from a different host or location. This is often used to obfuscate where adversarial attacks are coming from, and also can be the basis of "ACK-based" Denial of Service (DoS) attacks, where acknowledgement packets that are part of standard network protocols are sent to hosts that never initiated transmissions, etc. Various other potential issues arise when the guest OS or CPU potentially has access to the mapping and/or encapsulation functionality.

Figure 5:
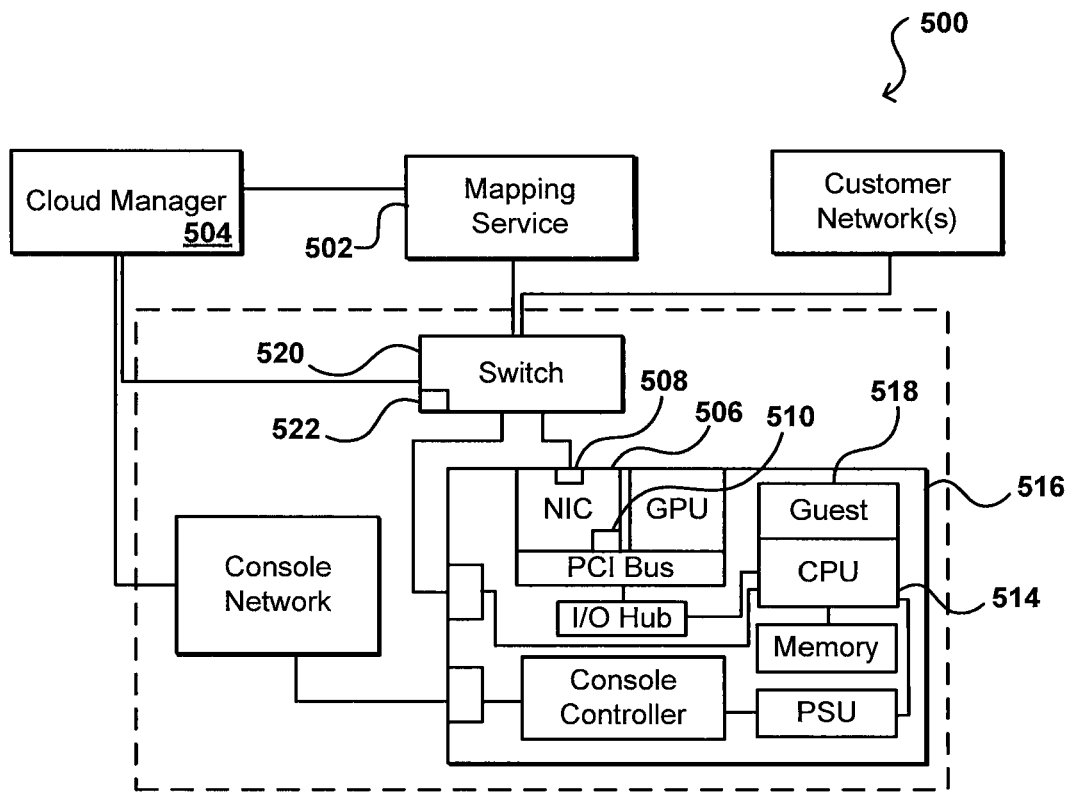
FIG. 5 illustrates configuration for processing packets that can be used in accordance with one embodiment.

Accordingly, systems and methods in accordance with various embodiments can provide substantially "bare metal" access to resources by various users, while performing operations such as encapsulation, decapsulation, and stateful firewalling operations using components that are not exposed to the customer, guest OS, CPU on a provisioned host machine, or other such potential sources of manipulation. FIG. 5 illustrates an example of a configuration 500 that can be used to perform packet-processing and other secure networking functions in accordance with various embodiments. In this example, packets are encapsulated "upstream" of the customer accessible host resources, here at the network card level, such as just before a packet is framed for physical interconnect transmission (e.g., Ethernet framing). In this example, it can be seen that the offload device 506 has an external port 508 that can communicate with components such as the cloud manager 504 and a mapping service 502. The external port 508 can enable these components to communicate with the offload device independent of the CPU 514 on the host machine 516, or any guest image 518 or guest OS provisioned on the host machine. Using such an approach, any packet transmitted to, or from, the cloud can be processed independent of the guest-accessible portions, such that the mapping is not accessible to, or modifiable by, the user. In this example, the offload device can have memory 510 and a processing device 512 capable of performing at least basic mapping, encapsulation, decapsulation, and/or similar such functions. This will be referred to generally herein as "offload device -based" encapsulation, although it should be understood that other peripheral devices or hardware components can perform similar functionality, and that the functionality is not limited to encapsulation but can also include other functions such as decapsulation, firewalling, etc. A offload device can function as an embedded system in the host machine that is not exposed to the user or guest operating system. In cases where the user might want native access to at least some of the functionality of the offload device, the offload device can have only certain memory portions mapped for the guest OS, such that only some functionality can be accessed. In some embodiments this can take the form of a virtual offload device image, wherein the guest OS can discover and/or utilize portions of the offload device, but cannot access portions utilized for secure actions such as encapsulation.

Offload device -based encapsulation functionality can be provided on a per-host basis, or at least for those host machines capable of receiving and/or transmitting packets, and/or capable of having a customer image provisioned thereon. In such cases, the cloud manager 504 or a similar component or system can manage the distribution of mapping information to the various hosts and/or nodes, as well as other such aspects and configuration information useful for such processes. In such cases, the cloud manager can communicate with an offload device 506 via the external port 508 to update configuration information, firmware, or other information useful for performing encapsulation and similar such actions. Processes for updating configuration information via an external channel are disclosed in co-pending U.S. patent application Ser. No. 12/554,690, filed Sep. 4, 2009, which is hereby incorporated herein by reference. Using such an approach, the firmware and/or configuration information for the offload device can be updated to perform the desired functionality, as well as to communicate with the mapping service 502 or other appropriate component(s) as needed. The configuration can be updated periodically, as can be managed by the cloud manager and/or mapping system(s), such as to send large payloads or otherwise adjust functionality of the offload device.

In some embodiments, encapsulation and similar processes can be executed at other components that are not exposed to the user, such as a smart switch 520 configured to route messages to, and from, a offload device 506 and/or network port 520 of a host machine 516. Such a switch can include a processor 522 operable to perform operations such as encapsulation of packets, whereby the switch can process and route packets to the appropriate addresses in physical and/or virtual address space. In such cases, the host machine can be considered (from an address space perspective) as being outside the cloud, or trusted environment, whereby the switch can function as an edge device and modify packets received from the virtual address space of the host machine (and client networks) to the physical address space of resources in the cloud. Various other components can be used as well, such as routers or dedicated edge devices, within the scope of the various embodiments.

One of the limitations in many conventional systems is that the physical transmission path or "wire" can only allow for relatively small packets of information, such as 1.5KB or 9KB packets. The use of smaller packets is not strictly a physical consideration, but is also results from historical and protocol definition reasons. For example, in modern networks where most or all links are switched and the transmission rates are high, this limitation could be increased by orders of magnitude without intolerably increasing collisions. Even though a physical network interface, such as an offload device, can only transmit or receive 1.5KB or 9KB packets, it is desirable in at least some embodiments to transmit larger packets from the DOM-U to the DOM-0 network stack and on to the offload device, and have the offload device segment the larger packet into multiple 1.5KB or 9KB packets. Many commodity offload devices support advanced functionality such segmentation offload to address the this requirement. An offload device with segmentation offload capabilities can be configured to receive and/or buffer relatively large packets, and segment or frame those larger packets into smaller packets or Ethernet frames that comply with the 1.5KB, 9KB, or other such size restriction. Devices receiving these packets can be configured to reassemble the larger packets based on the plurality of smaller packets.

Many offload devices provide advanced features such as TCP segmentation offload that can assist with high-speed networking. Systems and methods in accordance with various embodiments can take advantage of such features to provide for "virtual" networking, such as where a customer has access to a host device sitting between a customer address space and a provider network address space. Typically, segmentation offload functionality works only with well known level four ("L4") protocols such as TCP. When the packets are encapsulated such as described in the previous paragraph with respect to FIG. 4, the L4 protocol is changed to something other than TCP. Thus, segmentation offload features on the offload device are not able to work on such encapsulated packets. As used in the art for describing layers between the physical hardware ("level one") and an application running on that hardware ("level seven"), level four refers to a "protocol" level, which in the case of Internet protocols can refer to protocols such as the Transmission Control Protocol (TCP) and User Datagram Protocol (UDP). Receive side TCP segment processing assumes that the TCP segment payload is entirely customer data (or other such data). Hence on the transmit side, encapsulation related metadata cannot be added to L4 payload in order to retain the original L4 header, as the addition of metadata would lead the receive side to corrupt packet payload with encapsulation/decapsulation metadata.

Another potential problem with existing encapsulation and/or overlay network implementations is that the headers often do not include physical port information, which is utilized by conventional hardware devices for purposes such as routing and load balance.

Various embodiments can utilize fake TCP header with fake or, in some cases, the original port numbers, where the header is extended following established protocol rules (e.g., TCP options) and the encapsulation/decapsulation information is passed in the protocol extension. A "fake" TCP header, for example, can include any convention-appropriate port information in addition to any appropriate TCP-related information. By including this fake port information, conventional routers and other such devices can obtain improved load distribution, as many conventional hardware devices base load distribution decisions at least in part upon the port specified in the header. A router or offload device can see an IP address and TCP information, for example, and can process the packet as a standard packet. Such an approach also can be advantageous as it can be implemented primarily in software using conventional hardware devices and networks.

A protocol also can be used that does not change the level four payload (in the network stack, as discussed above). An original packet received from a user can include the payload (here a level four payload), along with a virtual IP address (at level three in the network stack) and an original TCP header (at level four). Using an encapsulation approach as discussed previously, a control host can attach a real address, such as $IP_R$, and a fake TCP header, $TCP_F$, (or $UDP_F$, for example) for use in routing the packet (or frame) in the physical or secure network. For the packet after encapsulation, the original virtual IP address, TCP (or UDP, etc.), and payload information now effectively form the level four payload, with $IP_R$ forming the level three address and $TCP_F$ forming the level four protocol header. Since the packets have original or fake port numbers, such a format can also solve issues such as the router ECMP hashing issue mentioned previously. A conventional NIC or similar device, however, will not know how to properly split a 64K or similar packet according to the encapsulated frame, as the NIC will not be able to properly interpret the information now contained within the level four payload. Also, as discussed, the level four payload has changed by including the $IP_V$ and $TCP_O$ information.

Various embodiments can instead take advantage of a slightly modified protocol format to handle the encapsulated packets. Conventional protocols provide for extra space at the end of a TCP header, which typically allows for what are referred to as "TCP options" or "TCP add-ons." These TCP options enable the TCP protocol to be expanded to include additional features. In some embodiments, the TCP packet can effectively be extended by about 24 bytes, with the additional information being declared as a TCP option. As should be understood, the packets can be extended by different amounts in different embodiments and/or implementations, and a 24 byte extension is just one example. The fake TCP header thus can include the original TCP information, plus the control header information. Information for the virtual IP address also can be included in this TCP option space. Thus, instead of adding the real headers during encapsulation and modifying the payload, the $IP_V$ and $TCP_O$ information can be included in the TCP options section of the fake TCP, such that the payload or data portion is unchanged.

In an example process for managing packet information with respect to a virtualized environment, a packet is received that includes virtual address information. If received to a host device or other machine to which the user has substantially fully access, the packet is directed to one or more devices or components upstream of the user-controllable hardware, such that the user is unable to modify the routing and other such processing. The packet transmitted between components, such as from the guest to DOM-0,can be up to 64KB in size in some embodiments, and thus can require segmentation. Mapping information for the packet can be determined, such as by contacting a mapping service to determine physical address information that corresponds to the virtual address information. Address information can be added to the received message, such as to an header (such as an $IP_R$ section), where the address information corresponds to the physical address to which the packet is to be directed. The virtual address information can be added to a protocol header, such as a TCP header, for the packet, without modifying the payload, such that the packet can still be routed, segmented, and otherwise processed by commodity hardware. The packet is transmitted to the offload device, which can segment the packets using TCP segmentation offload functionality and transmit the resultant packets to the wire, and on to the final destination. As should be apparent similar functionality can be used to process packets received from a physical address space, wherein mapping information is determined for the packet and virtual address information is added to the packet. Where the virtual mapping information does not specify a port, a "fake" port can be used that enables the packet to be processed on its way to the virtual destination, such as to enable load balancing or similar functionality.

In an example of a similar process for managing packet information with respect to a virtualized environment, an Ethernet frame is received to a physical network interface (e.g., a NIC), where the frame includes physical address information. Segments with information such as $IP_R$ and $TCP_F$ can be coalesced in some embodiments to generate one or more larger segments, which can improve performance. This can also be done by commodity NICs that support Receive Side Coalescing, since the packet format follows all TCP format rules and the TCP payload is exactly the same as customer packet's payload. The offload device (or other such device) is upstream of the user-controllable hardware, such that the user is unable to modify the routing and other such processing. Virtual address information can be extracted from the protocol header, such as a TCP header, for the payload, after removing header and footer framing information, for example. The virtual address information can be used to assemble a header for the data packet, extracted from the received Ethernet frame. The packet then can be processed, such as by transmitting the packet to a destination in the virtual address space. As should be apparent similar functionality can be used to process Ethernet frames received from a virtual address space, wherein virtual address information is extracted from the header for the packet.

Simply extending the TCP header may not be desirable in some embodiments, however, as if each packet received is 1.5K, and 24 bytes of information is added to each of these packets, then the packets would each now be over the 1.5K transmission limit and would each need to be divided into two packets, which can lead to an undesirable amount of overhead and additional traffic. It thus can be desirable in at least some embodiments to utilize this additional information while not significantly increasing the overhead.

Various embodiments take advantage of the fact that information such as the $IP_v$ and $TCP_O$ information are not needed for each packet upon segmentation, but can be determined upon desegmentation. One approach thus is to take the additional information for the $IP_v$ and $TCP_O$ information, etc., (about 24 bytes in one example) and create encoded information (about 120 bytes in one example), that in one embodiment is approximately one to five instances of the information in various embodiments, although other lengths of encoded information can be used as well, such as may depend upon the hashing technique. The encoded information can be reconstructed using a hashing or similar mechanism such that the original information can be reconstructed from at least 24 bytes of hashed metadata, which could be obtained from one or more instances of the segmented packet. Thus, instead of adding 24 bytes to each packet segment, for example, the additional 120 bytes or so can be split into appropriate number of pieces and can be positioned strategically along the payload, such as at boundaries where the data will be segmented. For example, a offload device or similar device can know that the data will be segmented automatically based on size at certain locations (including the additional 50 bytes). Since these segmentation locations are known, the offload device can insert the instances of the additional information at these segment lines (or otherwise within different segments) such that at least five of the 1.5K packets (or any other appropriate number of an appropriate size) will have information for the $IP_v$ and $TCP_O$ stored therein, but each packet will not include all 10 bytes of additional information.

When the packets are received, a desegmentation process can occur as with conventional systems. When the 1.5K segments are assembled into the 64K payload, or during the desegmentation process, the portions of information can be used to reconstruct the $IP_v$ and $TCP_O$ information, etc. An advantage to using a hashing process and distributing the information among the various packets, for example, is that the $IP_v$ and $TCP_O$ information can be reconstructed even if some of the 1.5K packets are lost, as long as at least two segments with the portions of information are received. The entire payload may not be able to be reconstructed, but at least the header information can be reconstructed. Further, the receiving device can simply request those 1.5K segments (e.g., Ethernet frames) that were not received, since the header information can be reconstructed, and hence does not need to request resending of the entire payload. Such an approach can have a much lower jitter variance, as there often will be no need to resend large packets, which could result in large variations in performance. In the case of video traffic, for example, as long as the data lost is not significant, the lost traffic can be neglected and thus need not be requested in at least some embodiments. This is an advantage of being able to receive partial segments successfully.

In an example process for processing packets in a virtualized environment, a packet is received from a customer address space, which includes virtual address information. As discussed, the initial packet received from the user can be a 64K packet with $IP_v$ and $TCP_O$ information. The packet can be received or directed to a control host or another such secure component, which is at least partially inaccessible to a user of a customer-partitioned device. The virtual address information can be translated to a real address using the secure component, such as by contacting a mapping service as discussed above. The TCP header (or other protocol header) can be updated if desired, but additional information such as the $IP_v$ and $TCP_O$ information can instead be inserted into the data. When adding the $IP_v$ and $TCP_O$ information to the data, this "virtualization" information can be hashed or otherwise split into multiple portions. If not already determined, the secure device can discover the segmentation limits for the transmission path, and boundaries for the segments of the user payload can be determined. The portions of the virtualization information can be placed adjacent to, or positioned with respect to, segmentation boundaries in central packets of the payload. The "new" packet or frame then can be passed on to the offload device or other such secure device, for example, which can automatically segment the packet into a set of packets of the determined size, such as 1.5K packets, with the number of segments depending at least in part upon the size of the overall packet. The IP and TCP header can be replicated for each packet, with potentially some small changes to compensate for the overall change in size, using segmentation offload processes of the offload device or other such device. The packets can then be transmitted to the destination.

A similar process can be used to process packets for a virtualized environment, wherein a set of Ethernet frames is received, at least some of the Ethernet frames including "virtualization" information that has been hashed or otherwise split into multiple portions. The virtualization information can be extracted from the underlying segment of each frame that includes a portion of the virtualization information in the associated payload. The virtualization information (e.g., header data) is reassembled, as long as a sufficient number of frames including the virtualization information was received, and the received packets can be desegmented to the extent possible. If not all frames were received but the header data was able to be reassembled, a request for only the missing segments can be sent.

When at least a majority of the packets are ultimately received at a destination, or device along the path to the destination, the device can attempt to desegment or reassemble these packets into at least one larger segment, if not the full 64K or other packet. As long as two packets (or a smaller number of packets than was generated originally during segmentation where the number of packets needed is determined by specific hashing technique) with additional header information in the payload are received, in at least some embodiments, these packets can be used to reconstruct the header data and desegment the packets, replacing the real address and protocol information with information for the virtual or client network, whereby the larger assembled segments can be passed on to the client or other destination. In some embodiments the desegmentation can occur on a offload device or similar device, while in other embodiments the desegmentation can occur using the guest operating system on a receiving device, etc. Further, various steps of the above process can be performed in any appropriate order, or in parallel, and fewer, additional, or alternative steps are possible within the scope of the various embodiments.

Using virtualization, a number of virtual machine instances can be generated that appear and function to a user as being a part of the customer network, but that are mapped to actual servers or other physical resources in a separate or remote cloud, network, etc. As discussed, using a standardized address space can require the building and maintaining of a mapping between the physical substrate addresses and the virtual overlay addresses that are used for the customer address space. In some existing approaches, a central processing unit running on a host device can control the mapping of the virtual and physical addresses, such that a request received from a customer can be directed to the appropriate resource. This can take the form of data packet encapsulation and decapsulation, for example, wherein the physical address and/or header information can "co-exist" at various times with the virtual address and/or header information, such that a packet can be addressed to the virtual address by a source on the customer network, but can be properly routed to the appropriate physical address by adding the A framework can be implemented by conventional or other networking components, such as commodity NIC devices, that can enable these components to support multiple protocols, such as a variety of different standard and proprietary protocols. These commodity devices then can provide the enhanced performance and other advantages used for the conventional protocols of these devices, independent of the customer-specific format of the packets. A NIC vendor, for example, can implement a framework that enables the NIC to be used by a customer with any compliant protocol, without any customization or need for special hardware.

In one example, an offload device in a network environment can process TCP segments. The customer network might utilize packets of a size (e.g., 64K) that cannot typically be passed from the offload device out onto the network, as the offload device might only be able to transmit network packets on the order of 8K or 9K in size, for example (depending on network configuration and other such issues). As discussed above, technologies exist that allow larger packets to be segmented at the offload device into multiple Ethernet frames of the appropriate size (e.g., 1.5K or 9K, etc.). For example, TCP Segmentation Offload (TSO) and Receive Side Coalescing (RSC) can be used on the egress and ingress endpoints, respectively, to increase network throughput performance by enabling the host to deal with larger TCP segments (e.g., 64K in size). TSO is a technique for segmenting TCP packets into segments of the appropriate size for transmission over the network, and RSC enables these segments to be reassembled at the other side of the network. In general, however, techniques such as TSO and RSC are not supported for packets encapsulated with proprietary protocol information, such as the additional header information illustrated in FIG. 4. For example, packets that are encapsulated using a proprietary format are typically larger than TCP packets and do not have the anticipated TCP header information, such that the offload device will not recognize these encapsulated packets.

By implementing an appropriate framework, however, an offload device or other appropriate network component can have the ability and specifications to map the encapsulated packet to something that the component can understand as a TCP packet. Once an offload device recognizes the packet as a TCP packet, for example, the offload device can segment the packet, add the appropriate headers, and/or do any of the other things that a offload device typically would do for a conventional TCP packet. Even for packets encapsulated with any of a variety of different protocols, TSO and RSC can provide a significant improvement (e.g., up to an 80% performance boost) as well as other well established advantages. Further, by implementing a framework the offload devices can not only be used with different protocols, but also can enable customers to upgrade or change protocols without having to purchase, upgrade, or modify their existing hardware.

An opaque field can be used with an encapsulated packet to include any information utilized by the particular format or protocol of the customer network, such as GRE or other such protocols. The opaque field in at least some embodiments is a TCP- or UDP-based header, or other such protocol header. In one example the opaque header has a first set of information at a specified offset in the opaque field that indicates or identifies the particular format of the segment or packet. For example, the information can be a two-byte field that includes a value corresponding to a particular format. The network hardware can contain, or have access to, a mapping of values from the first offset value and the corresponding formats in order to determine, from the value of the first set of information, the appropriate format of the packet.

In this example, the opaque field also includes a second field of information at a specified second offset in the opaque field. This second field can be of an appropriate length, such as two bytes, and can include a value that specifies a flow identifier, or an identifier for a specific flow of traffic, as may be useful for desegmentation. In some embodiments, this field can identify a unique TCP flow (or other flows such as a UDP flow) along with a regular 5-tuple when performing a TSO or RSC operation on a particular format packet.

These examples can correspond to an environment for a specific protocol, for example, where the header has information such as the virtual network to which the packet belongs, the virtual machine from which the packet originated, and/or the virtual machine to which the packet is heading. This information will not change between packets within a common TCP stream. Slot IDs, or virtual machine identifiers, can be used for connection information since in a virtualized network environment, for example, there could be two different virtual machines on the same physical host that belong to two different virtual networks. Those virtual machines could have exactly the same IP address, and could potentially communicate with someone who happens to have the same port and IP address. From a TCP standpoint, the 5-tuple can be exactly the same. Other information such as source IP and destination IP, source port and target port, etc., can also be exactly the same. Thus, from a TCP standpoint the connections appear as the same connection, but could actually be in two different private networks. The use of slot IDs can uniquely separate these situations. For other protocols, values other than virtual machine identifiers can be used as should be apparent.

In one example, an encapsulated packet is received to an offload device. The offload device, using the specifications of the framework, can analyze the packet to identify that the packet is encapsulated and has to be handled differently than a conventional TCP or UDP packet. In one example, an encapsulated packet includes inner and outer IP headers. The encapsulated packet also has an opaque field (that can appear as part of the payload), which can be used for protocol-specific information. The length of the opaque field, and the information contained therein, can vary between embodiments. In order to identify the packet as being encapsulated, the outer IP header can contain pre-configured protocol information. Further, the packet can contain at least one two-byte field in the opaque field (although other sizes and locations can be used as well within the scope of other embodiments). The two-byte field can be a pre-configured distance from the start of the opaque field, and the value of the two-byte field also can be pre-configured. The combination of the protocol information in the outer IP header and the format information in the two-byte field of the opaque field can enable the offload device or another network component to recognize that the packet is encapsulated, as well as the format of the encapsulation. Since the offload device does not otherwise look at other information in the opaque header, the opaque header can include information specific to any particular protocol without affecting the processing of the packet by the offload device. The two bytes in the opaque header can identify a specific format of the packet, which can assist in determining the rules or policies for processing the packet. Based upon this the information in the outer IP header and opaque field, the offload device can analyze each received packet to determine whether the packet can be processed using conventional approaches or whether the packet is an encapsulated packet and should be processed according to special rules specified by the framework.

During a TSO process, for example, the segmentation of egress (e.g., outgoing) TCP segments can be performed using a standard algorithm on the TCP segment data starting at the inner IP header. The large encapsulated packet is segmented into a number of packets of a size enabling the segments to be transmitted over the network. In order for the framework to also work with stateless tunneling, the opaque field is copied verbatim to each of the resulting segmented TCP/IP packets, and placed between the inner and outer IP headers. The outer IP header is copied to each resultant packet and appropriate adjustments, such as a change to the "length" information, can be made using the same logic applied to the inner IP header. Further, an IP ID can be generated, which is part of the IP header, along with a checksum for the IP header.

Similarly, during an RSC process TCP flows of the packets or segments having the special protocol format information are defined by the regular 5-tuple of the TCP ports, the inner IP addresses, the inner IP protocol field, and the inner L4 ports (e.g., TCP ports or UDP ports), as well as an additional two bytes at the pre-configured offset from the start of opaque field. It should be understood that TCP flows of the special format packets will not overlap with flows of regular packets. Further, it should be understood that terms such as "packets" are used throughout for purposes of simplicity of explanation, but at other locations or instances processes might involve objects more commonly referred to as segments or frames, and the common name for a single object might change between these and other terms at various points in the processes discussed herein.

RSC is performed using a conventional algorithm on the TCP packet data starting at the inner IP header. When coalescing the related TCP packets, the opaque field from the first TCP packet can be copied to the resultant TCP segment between the inner IP header and the outer IP header. The outer IP header of the resultant TCP segment can be coalesced the same way the inner IP header is coalesced. If there are restrictions on the IP flags (e.g., "Don't fragment" or "More bit") that force the ingress packets to be ineligible for RSC, the restrictions can be applied to IP flags both in the inner and outer IP headers.

RSC can maintain hash buckets (or other queues or temporary storage locations) for each connection for which packets are being received. When a TCP packet is received, the receiving device then can determine the connection to which the packet belongs, using information such as the IP and TCP information as well as sequence number bits in the outer TCP header, and can queue the packet to the appropriate hash bucket. For buckets where there are already packets, the network component can attempt to merge the segmented packets until the full packet has been coalesced. Conventional criteria can apply, such as sending the coalesced packet on to the operating system when the size reaches a certain threshold or the packets are queued for a specific length or range of time.

In at least some embodiments, however, the concept of a connection will differ from a connection for standard TCP packet processing. Instead of the conventional 5-tuple, mentioned above, connections will be determined based on a 6-tuple, which includes the standard TCP connection information of the 5-tuple along with the new piece of connection information identified in the two bytes of the opaque field. Once the network component figures out that the packet is to be processed using the special rules, the component uses the 6-tuple instead of the 5-tuple to figure out the connection information, and then executes the RSC process essentially the same as for conventional packets, to coalesce the packets, check the sequence numbers, etc.

In addition, RSC also in many cases needs to throw off the opaque bits of all but the one of the packets being coalesced, such as the first received packet in some embodiments. In some embodiments RSC may not be performed when the opaque fields do not match, such that the opaque fields from the other packets will not be discarded at least until those packets can be otherwise processed. After one copy of the opaque bits is received and stored (at least stored temporarily or cached, for example), opaque bits of all other packets to be coalesced that match the stored copy of the opaque field can be discarded by the offload device. Further, since the total length of the packet is changing during the merge the offload device will have to make appropriate adjustments to the checksum, IP header flags, or other such information, for both the outer IP and inner IP headers. In the opaque fields, and elsewhere, the byte counts and other aspects could also be changed. Apart from the two bytes (or n-bytes) of information used for identification, the expectation is that the rest of the opaque bits will be exactly the same for all packets within a particular TCP stream. In one protocol example, the opaque information could correspond to a specific network identifier. There also can be other information, such as a virtual machine identifier or slot ID, which will be the same for each packet in a TCP stream. In particular, the n-bytes can identify the packet as corresponding to a particular virtual machine.

In many embodiments, the framework relies upon specific pre-configured values. For example, as discussed above, the framework can rely upon a pre-configured length of the opaque field, as well as an IP protocol value that identifies specific or special formats for the received packets. The length of the opaque field in some embodiments corresponds to the length of the header for the special format of the packet. The IP protocol value could be any appropriate identifier for a specific protocol. The framework can expect that the offset of the n-byte field in the opaque field that identifies the format is pre-configured. In some embodiments, this can correspond to a specific port value.

The specific pre-configured values of the opaque field can vary for certain protocols. For example, the length of the opaque field for GRE support can be 16 bytes in one embodiment, with the IP protocol value that identifies a specific packet or segment format set to a value such as 47. The offset value that identifies a unique flow can be set to a value such as 10 to point to a part of a 'key' field or other such value.

In the case of an example protocol, the length of the opaque field might match the length of a protocol-specific header, with a value such as 20. The IP protocol value that identifies packets or segments of a particular protocol can be set to the IANA protocol number for UDP, for example, with a value such as 17. The offset value in the opaque field that identifies packets or segments of a particular format can rely at least in part upon the specific UDP port used, such as a UDP destination port with a value 2. The value of the field that identifies a unique flow when performing TSO or RSC can specify the source slot and target slot IDs along with the regular connection 5-tuple to identify a unique TCP flow. It should be understood that similar approaches can be used to determine values for other protocols within the scope of the various embodiments.

As mentioned above, one goal of an environment such as a cloud computing platform can be to provide each customer with the illusion that a portion of the network infrastructure is dedicated to that customer. In order to provide this illusion, the platform needs to provide certain levels of performance, such as may include low jitter, low latency, and high throughput network performance. Though jitter should always generally be low, the definition of low latency and high throughput for a given implementation depend upon factors such as the physical network equipment and product design, and will can vary between instances. The illusion can also be provided in part by enabling the customer to define a customized level two (L2) or level three (L3) network topology, with no addressing restrictions resulting from other customer preferences. In certain environments, such as in the Virtual Private Cloud (VPC) environment offered by Amazon.com, Inc. of Seattle, Wash., the option of a customizable L2 or L3 routable network is accomplished largely via a sophisticated software implementation of IP address tunneling. In at least some of these software implementations, however, it can be difficult to maintain low jitter, low latency, and high throughput networking performance in a virtualized environment. The problem may be further exacerbated as current hardware trends continue with more cores, RAM, and virtual machines per host, placing an increasing burden on the networking subsystem. Though gains may be made by optimizing the end-to-end software stack, it can be beneficial in at least some environments to provide a hardware assist in the virtualization of network resources.

Figure 6:
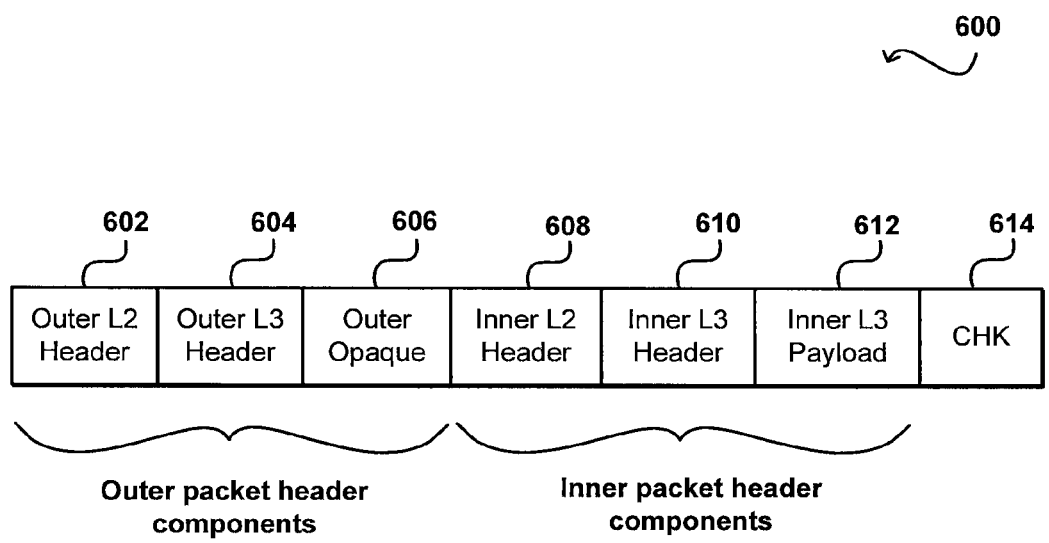
FIG. 6 illustrates an example packet header that can be used in accordance with various embodiments.
Figure 7:
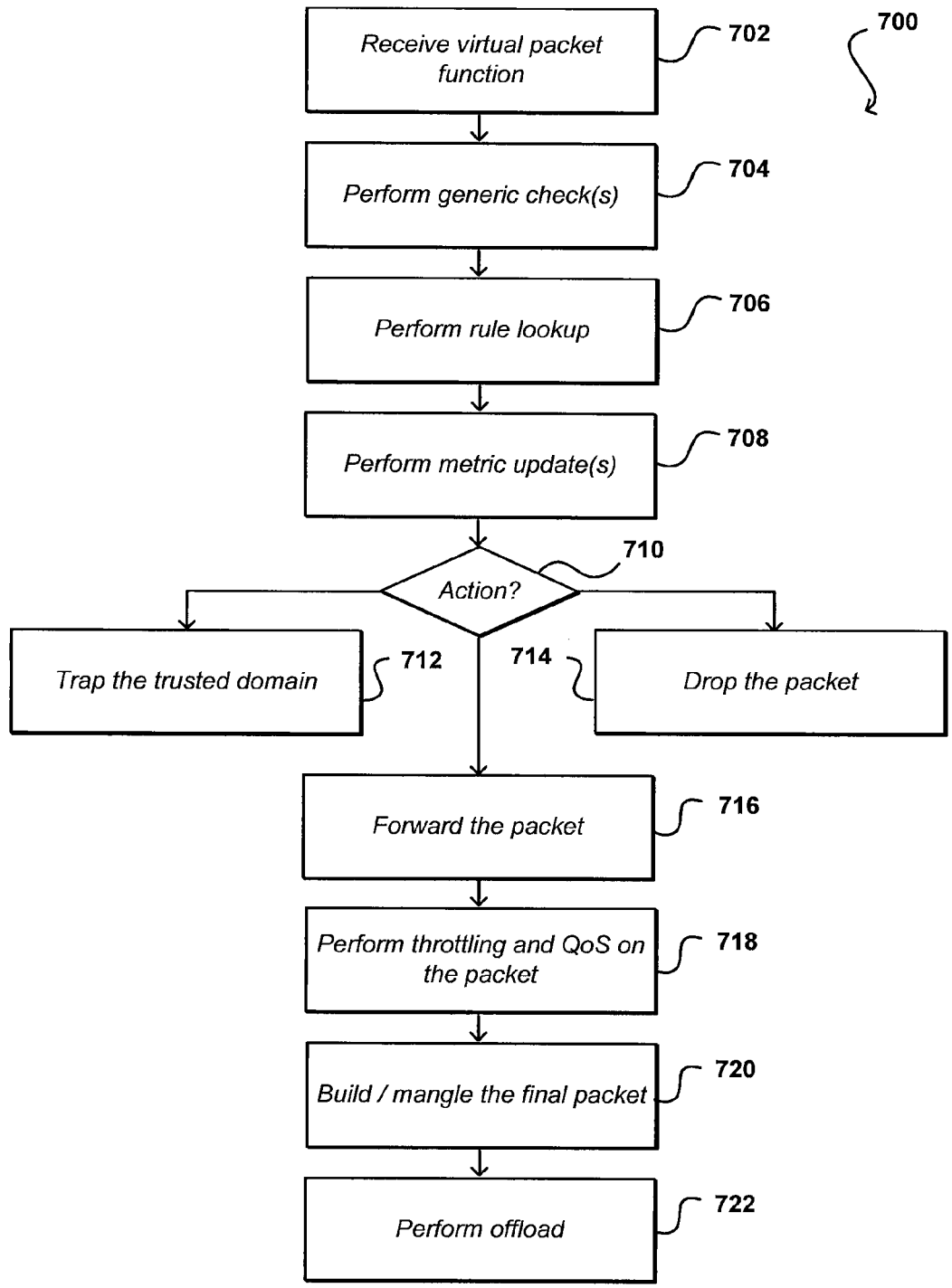
FIG. 7 illustrates an example of a fifth process for processing packets that can be used in accordance with various embodiments.

In order to satisfy at least some of the goals outlined above, hardware such as various offload devices may need to include various features. As used herein, "hardware-based" processing generally refers to any processing in which a hardware device performs at least a part of that processing, or wherein a processing component presents itself as a physical device (e.g., a NIC) but may actually be implemented as hardware and/or software. In some embodiments, hardware-based processing may be provided through a generic offload device or embedded system that appears to components of the system to be at least one hardware component. As an example, a generic offload device can be used that presents itself as an SR-IOV device. A discussion of these features will be provided by giving a high level overview of the proposed egress and ingress paths, followed by details on individual stages that can be implemented in accordance with various embodiments. For example, FIG. 6 illustrates an example format 600 of such a virtual packet. FIG. 7 illustrates a high level overview of an example offload hardware egress process 700 that can be used with such customer packets of a customer in a virtualized data center in accordance with at least one embodiment. As part of the egress process, an SR-IOV Virtual Function (VF) assigned to the customer virtual machine receives an egress packet destined for the customer's virtual network 702. In this initial state, the inner components 608, 610, 612 of the packet header 600 are present, while the outer components 602, 604, 606, and 614 are not present. One or more generic checks can be applied to the egress packets 704. These checks can include, for example, L2 and/or L3 source anti-spoofing, as well as trapping for all non-IP and broadcast packets (i.e., to service DHCP, ARP, etc.). The offload device can perform a lookup in a pre-populated rule table 706, such as may be based on an L2 destination and an L3 destination with a subnet mask, with a generic case being an IPV4 "/32" subnet that specifies a single target. Assuming a rule hit with a rule type of forward, the rule can also specify a pointer in system memory to the tunnel header that the offload device will prepend to the outgoing packet. At this point, the packet can also include the initial outer components 602, 604, 606. The offload device can perform one or more metric updates 708, which are discussed in further detail below.

Based at least in part upon the rule match (or lack of a rule match), the offload device can determine an appropriate action to take 710. Actions can include, for example, to trap to the trusted root domain 712, drop the packet 714, or forward the packet with encapsulation and/or mangle 716. If the offload device decides to trap the packet to the trusted domain 712, a driver callback can allow the trusted domain to perform further software-based processing of the packet. If the offload device decides to drop the packet 714, no further processing will be done (in at least some embodiments). If the offload device instead decides to forward the packet 716, further processing can be required before the packet can be released onto the physical network. In this example, the offload device takes throttling and QoS action on the packet 718, such as is described below in further detail. The offload device also can build and/or mangle the final packet that will be fed to the offload engine 720. The outer packet header components 602, 604, 606 can be prepended to the packet. These can have been retrieved via scatter and/or gather DMA along with the packet bytes based on a previous rule match. The offload device then can perform the offload(s) 720, including TSO if applicable. The packet header fields can be updated as necessary including, but not necessarily limited to, inner and outer IP length, inner and outer TCP checksum (i.e., if the IP protocol is TCP), inner L2 MAC source and destination address, and inner L3 IP TTL, as discussed in more detail below.

Figure 8:
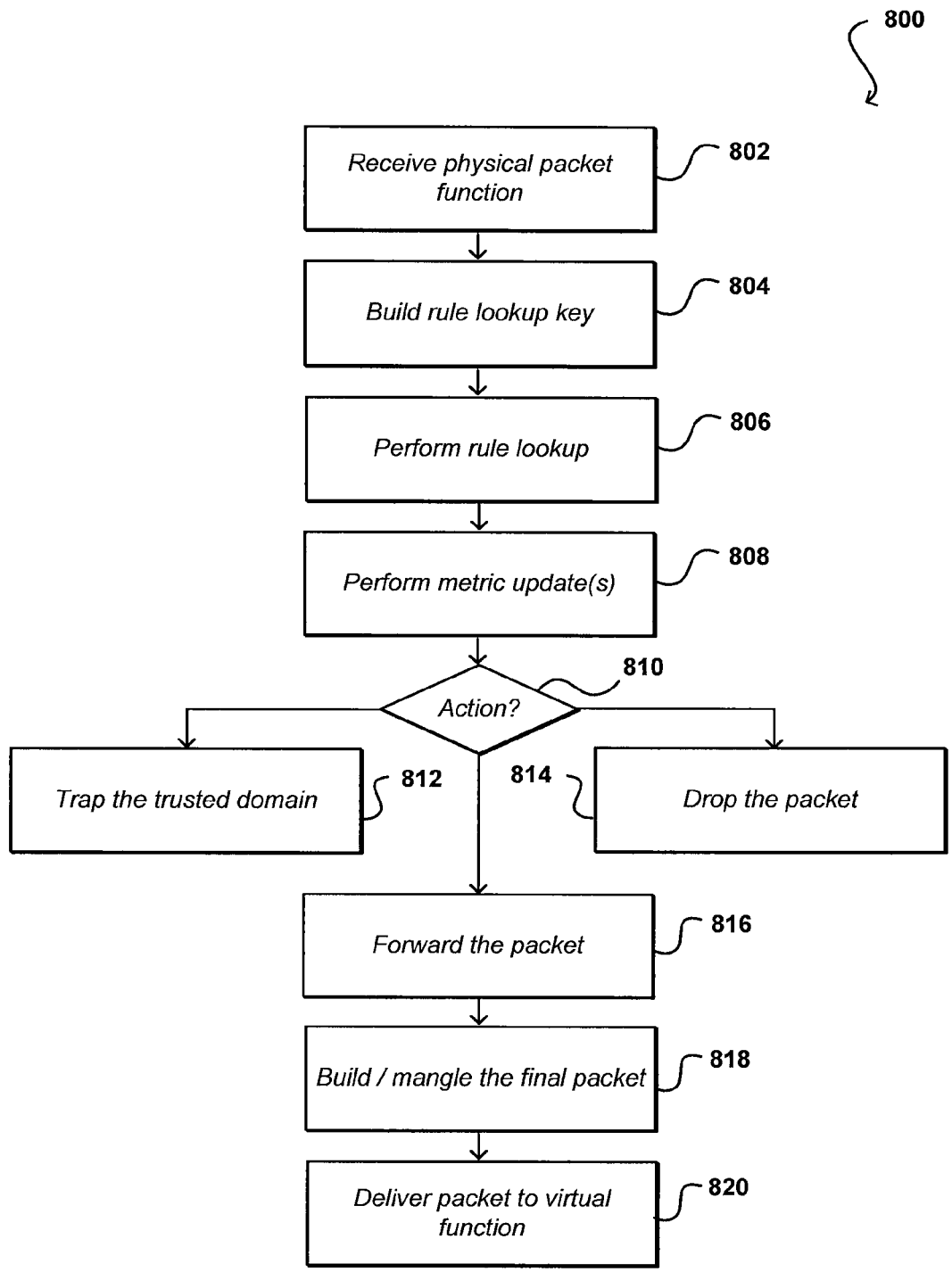
FIG. 8 illustrates an example of a sixth process for processing packets that can be used in accordance with various embodiments.

FIG. 8 illustrates a similar high-level overview of an example offload device hardware-based ingress process 800 for a customer packet in the virtualized datacenter that can be used in accordance with at least one embodiment. In this example process 800, a packet is received on the offload device physical function 802. The offload device can build a rule lookup key that will be built for subsequent rule processing 804, as discussed in greater detail below. The offload device then can perform a lookup in a pre-populated rule table based on the derived lookup key 806. The offload device can perform various metric updates 808 as necessary, and determine the appropriate action to take based at least in part on a rule match (or lack of rule match) 810. In a first action, the offload device can decide to trap the packet to the trusted root domain 812. In this case a driver callback can allow the trusted domain to perform further software-based processing of the packet. In another possible action, the offload device can decide to drop the packet 814, such that no further processing of that packet will be done. As another possible action, the offload device can decide to forward the packet to an internal VF 816, such as with encapsulation and/or mangle. The VF (VM) ID can be specified in the forwarding rule. The offload device can strip the outer encapsulation headers 602, 604, 606 from the packet 818. No inner mangling is required in this example, as all such mangling was previously done on egress. Various other packet modifications can be performed as well, such as to reorder, split, or otherwise modify one or more packets or packet data portions. At this stage, the packet can be delivered to the guest VM via the guest VF 820.

As mentioned, such an approach can provide for hardware-based, rule-based packet mangling and encapsulation of packets. Such an approach allows multiple (and possibly overlapping) customer virtual networks to be overlaid on a unified L3 routable physical substrate. A common rule table can be used for both egress and ingress packet paths, the rule table being populated by the trusted root domain via software mechanisms in at least some embodiments.

The following provides guidelines on the size and performance of an example rule table implementation that can be used in accordance with various embodiments. An example rule table can have on the order of about 1,000 rule entries (shared between ingress and egress) per virtual machine running on the host. Though in at least some embodiments it can be desirable to utilize the largest rule table size possible, there will in at least some cases be a limit on the rule table size imposed by device RAM, as the primary cost of the increased table size will be increased RAM requirements on the offload device. As the number of VMs on a host increases, the number of rules can vary accordingly. For example, if there are 128 VMs and 128 corresponding SR-IOV VFs, there would be 128,000 rule entries in at least one embodiment, although a number such as 32,000 or 16,000 may be tenable. The rule entries in at least some embodiments should be divisible between VFs as defined by the trusted root domain. For example, one VF could have 10 rule entries while another VF has 2,000 out of the possible total number of rule entries. The performance of rule table updates should also be fast enough so as to not cause excessive stalls in the packet processing pipeline. In some embodiments, the rule table might be modified in its entirely on the order of every five seconds or so, during normal operation.

An example egress rule table can have a variety of different fields. In one example, a rule table has an Inner L2 destination MAC (match target) field. All egress rules can be matched on the inner L2 MAC address. This allows for the customer's virtual network to be L2 only, if desired (and to support protocols like RoCE that are not L3 aware). The table also can have an optional inner IPV4/IPV6 destination with subnet mask (match target) field. Egress rules can optionally be matched on the target IP address/subnet. The use of subnet rules allows multiple rules to be collapsed if desired. An optional inner L2 MAC source/destination mangle replacements field can be used as well. In order to support an arbitrary L3 topology, the ability to swap both inner destination and source MAC addresses to support "phantom routers" can be supported. A VM might, for example, believe that it is on subnet A and is trying to send a packet to subnet B. Thus, the packet could have an L2 header as built by the guest VM, such as:

L2 MAC source address: MAC address of host 1 (subnet A) VF offload device

L2 MAC destination address: MAC address of subnet A gateway

At egress time, it can be desirable in at least some embodiments to be able to dynamically mangle the inner L2 header to look like the following example (so that when the packet is de-capsulated on the target the inner L2 header looks like what is expected had there been real router(s) in between the 2 virtual machines):

L2 MAC source address: MAC address of subnet B gateway

L2 MAC destination address: MAC address of host 2 (subnet B) VF offload device

An optional inner IP TTL decrement field can also be used. In order to support "phantom routers," for example, the ability to optionally auto-decrement the inner IP TTL (if applicable) may be required. If the TTL reaches zero, the packet should be trapped to the trusted root partition.

The table can also have a field such as for a pointer to encapsulation blob in system RAM. A table of blobs can be stored in memory owned by the trusted root partition. These memory addresses can be, for example, host physical addresses or guest physical addresses of the trusted root partition, such as may depend on machine-specific DMA mechanisms. The table can also include additional fields as well, such as a field for metrics and at least one field for rule actions. As discussed above, the rule actions can designate, for example, to trap the trusted root partition, drop, or encapsulate/mangle and forward a packet.

Figure 9:
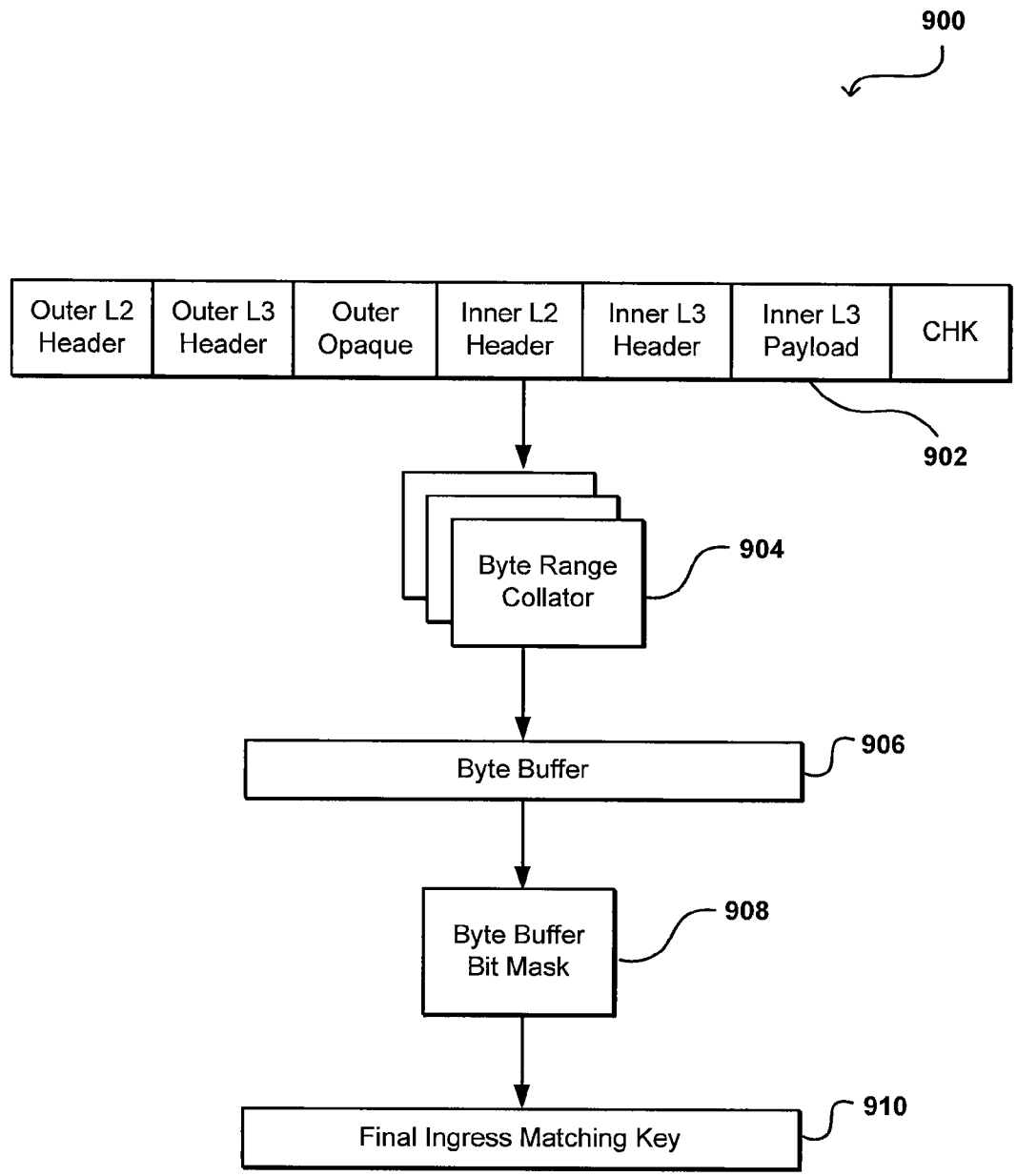
FIG. 9 illustrates an example flow for processing packets that can be used in accordance with various embodiments.

An example ingress rule table can have various fields as well. For example, a match key (match target) field can be used for ingress rule matching, which can be one of the more complicated aspects of the system. In order to not have hardware that requires a specific encapsulation format, a scheme can be utilized that is as generic as possible within what is reasonably obtainable in hardware. FIG. 9 shows an example implementation of ingress match key creation that can be used in accordance with one embodiment. The offload device can utilize several system-defined byte ranges and/or byte range collators 904, which can be programmed by the trusted root partition at system initialization, to collate byte ranges from incoming packets 902. These packets can be collated into a temporary byte buffer 906, or other appropriate location. In at least one embodiment, four byte ranges of 0-128 bytes, with no more than 256 bytes from the start of the packet, can be sufficient, where all byte ranges together do not total more than 128 bytes. A further system-wide bit mask 908 (programmed by the trusted root partition) then can be applied to the byte buffer to determine which bytes are used for matching in the rule table. The final ingress matching key 910 then can be produced as a result, where the key can be used to look up the appropriate rule in the ingress rule table.

Other fields can be used with the ingress rule table as well. For example, a VM/VF ID field can be used that can explicitly specify the VM/VF ID to which to forward, where the rule action includes forwarding to a VM/VF. Other fields can include, for example, a metrics field and a rule action field, similar to the egress rule table discussed above. Metrics can be collected by the hardware for later retrieval by the trusted root partition. Example of metrics that can be required per ingress/egress rule include the number of bytes acted on (dropped, forwarded, etc.) and the number of packets acted on (dropped, forwarded, etc.). Each metric field should be readable and clearable by the trusted root partition. The size of the fields can be at the discretion of the hardware vendor, for example, and can assume an interrupt-driven collection method from the trusted root partition.

In at least some embodiments, there are at least two rough types of throttling or quality of service (QoS) possible. A first type is referred to herein as a "hard caps" type of throttling, wherein each throttled entity is capped at a specific amount, regardless of the usage of other throttled entities in the system. A second type is referred to herein as a "burstable caps" type, wherein throttled entities are allowed to burst above their caps depending on whether there is excess capacity available in the system. In an example embodiment, the ability to place hard caps can be required, such as at 50 Mb/s intervals (or 10-25 Mb/s intervals, in some embodiments), on SR-IOV Virtual Functions. In at least some embodiments to utilize, in hardware, at least one throttling class per egress rule, such that different traffic can be throttled at different rates, and one QoS class per egress rule, such that different traffic can be prioritized. It also can be desirable in at least some embodiments to provide one or more configurable, burstable throttling classes per rule, such that unused system capacity can be consumed if available and desired.

In at least some embodiments, it can be desirable to provide various checks on packets. For example, in some embodiments all egress packets must be checked for the correct L2 MAC address that has been assigned to the VF. If the egress packet is an L3 IP, the source IP address must be checked as well in at least some embodiments. Packets that do not have the correct L2 MAC and/or L3 IP address should be dropped in at least some embodiments. There also can be the capability to configure all L2 and/or L3 broadcast traffic to be trapped to the trusted root partition, including DHCP, ARP, IP broadcast and multicast, etc. Further, the trusted root partition in at least some embodiments will have the ability to inject ingress packets into virtual function packet queues. These packets can circumvent the normal mangling/encapsulation system.

In at least some embodiments, the offload device hardware will support at least one standard set of offloads and hardware enhancements while doing encapsulation/mangling on SR-IOV virtual functions. These can include, for example, TCP segmentation offload (TSO) including the various checksum offloads, multi-queue capability, and interrupt coalescing. The set also can include RDMA support (e.g., RoCE or iWARP). Even if an L2-only RDMA protocol is used, for example, the fact that the packet is encapsulated inside of an L3 wrapper means that the application level protocol can be agnostic from the underlying physical network substrate.

The use of SR-IOV can negate a benefit of virtualization in that the underlying hardware is no longer abstracted. In order to preserve the same level of flexibility while providing advanced functionality to users, hardware vendors can provide approaches to dynamically injecting driver code from the VMM into the guest VM. Such an approach can enable a single abstract driver in a guest VM to run on arbitrary hardware via a common interface, thus wrapping either a hardware device fully emulated in software or one that is largely implemented in hardware.

In addition to those listed above, various other rules can be implemented as well. For example, for egress packets there can be a list of allowable destination MAC addresses and destination IP subnets that form the 'match' part of each rule. A rule can have a destination MAC address and destination IP subnet, or the rule can have just a destination MAC address in which case all IP addresses can be accepted. Each rule can have an 'N' byte opaque header, a source MAC address, and a target MAC address as part of the rule. When a rule is matched, the 'N' byte opaque header can be inserted before the original L2 header, and the MAC addresses in the L2 header can be replaced with pre-specified values. New outer L2 and L3 headers (e.g., MAC and IP) can be inserted in front of the opaque field with an outer source IP address, outer destination IP address, outer destination MAC, and outer source MAC from the rule table. Optionally the opaque header can include L2 and L3 headers, where the offload device can fill in fields such as ID, length, checksum, and flags on the fly. In some embodiments, the inner source and destination IP addresses are also replaceable, such as to allow for future virtualization of NAT, anycast, etc.

At least part of the processing and management can be performed by a software management interface operable to execute in a trusted host platform, such as Xen Dom-0. Such an interface can communicate with distributed services to load per-tenant network specifications in real time, such as may include throttling, security groups, and partner components. The interface can instruct an offload component to execute per-tenant (SR-IOV) specifications, for example. These commands can be processed in real time, as the specifications change. The interface also can perform extended management of the offload component-based rules if the hardware or other offload component is unable to concurrently hold the totality of the rules at any given time. These can include, for example, techniques such as loading hot rules, or a subset of frequently-utilized rules, while processing a subset of less often used rules via software trapping or another such process. The interface can differentiate between different types of traffic, such as traffic destined for the trusted host platform or a virtual tenant, and can deliver accordingly.

In at least some embodiments, packets that require special handling such as address resolution protocol (ARP) packets and multicast packets can also be managed by a software management component in the Dom-0. Other advanced functionality such as DNS, a security interface, and a Web server interface can also be handled by the software management interface. For a security interface, an instance can perform a secure login before obtaining network connectivity. The Web server interface can be, for example, an interface to a metadata service or other such application.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A framework for processing data packets in a multi-tenant environment, the framework comprising:
   at least one processor; and
   memory including instructions that, when executed by the at least one processor, cause the at least one processor to:
      communicate with one or more distributed services to load into the memory one or more per-tenant network specifications;
      instruct at least one offload device to execute the loaded one or more per-tenant network specifications to apply a set of rules for processing the data packets;
      manage the set of rules for the at least one offload device when the at least one offload device is unable to concurrently store all of the set of rules by loading a first subset of the set of rules into the at least one offload device while processing a second subset of the set of rules; and
      deliver the data packets to an appropriate destination for each of a plurality of traffic types after the at least one offload device has attempted to match the set of rules to the data packets.

2. The framework of claim 1, wherein the framework provides a software management interface configured to execute in a trusted host domain.

3. The framework of claim 2, wherein the software management interface is further configured to manage the data packets that require special processing.

4. The framework of claim 3, wherein the data packets that require special processing include multicast packets, broadcast packets, and address resolution protocol (ARP) packets.

5. The framework of claim 2, wherein the software management interface is further configured to manage functionality including at least one of domain name service (DNS), security interfacing, and web server interfacing.

6. The framework of claim 2, wherein the software management interface is used to configure network statistics that need to be collected, and statistics to be maintained, by the at least one offload device.

7. The framework of claim 1, wherein the one or more per-tenant network specifications include specifications for at least one of throttling data packets, operating security groups, and communicating between partner components.

8. The framework of claim 1, wherein the one or more per-tenant network specifications are single root I/O virtualization (SR-IOV) network specifications.

9. The framework of claim 1, wherein the one or more per-tenant network specifications are processed in real time as the specifications change.

10. The framework of claim 1, wherein managing a set of rules for the at least one offload device includes loading the first subset of the set of rules in the offload device while processing the second subset of the set of rules using software trapping.

11. The framework of claim 10, wherein the first subset of the set of rules is utilized more often than the second subset of the set of rules.

12. The framework of claim 1, wherein the one or more per-tenant specifications enable a hardware vendor to support multiple protocols without obtaining specific information about the multiple protocols.

13. The framework of claim 1, wherein the traffic types include at least one of traffic destined for a trusted host platform and traffic destined for a virtual tenant.

14. An offload device, comprising:
a processor; and
memory storing instructions that, when executed by the processor, cause the processor to:
expose the offload device as a physical hardware device;
receive a user data packet to a physical function of the offload device; and
perform at least a portion of processing of the user data packet using the processor, the processing including at least stripping an inner and outer header of the data packet, performing any packet modification, and forwarding the user data packet to an internal virtual function, the internal virtual function operable to deliver the user data packet to a guest virtual machine executing on a host computing device.

15. The offload device of claim 14, wherein the processing includes removing at least one outer encapsulation header from the user data packet.

16. The offload device of claim 14, wherein the offload device is a network interface card (NIC).

17. The offload device of claim 14, wherein the offload device is configured to support multiple protocols without obtaining specific information about the multiple protocols.

18. A method for processing data packets in a multi-tenant environment, the method comprising:
communicating with one or more distributed services to load one or more per-tenant network specifications;
instructing at least one offload device to execute the loaded one or more per-tenant network specifications to apply a set of rules for processing the data packets;
managing the set of rules for the at least one offload device when the at least one offload device is unable to concurrently store all of the set of rules by loading a first subset of the set of rules into the at least one offload device while processing a second subset of the set of rules; and
delivering the data packets to an appropriate destination for each of a plurality of traffic types after the at least one offload device has attempted to match the set of rules to the data packets.

19. The method of claim 18, further comprising:
exposing a software management interface configured to execute in a trusted host domain.

20. The method of claim 19, wherein the software management interface is further configured to manage functionality including at least one of domain name service (DNS), security interfacing, and web server interfacing.

21. The method of claim 19, wherein the at least one offload device operates according to single root I/O virtualization (SR-IOV) network specifications.

* * * * *